United States Patent [19]

Kirkland et al.

[11] Patent Number: 4,495,724

[45] Date of Patent: Jan. 29, 1985

[54] PRODUCT AND METHOD OF MAKING A SEED COATING FOR INCREASED YIELD

[76] Inventors: Edmund R. Kirkland, Rte. 3, Box 342, Lumberton, N.C. 28358; Elko Palanuik, P.O. Box 910; Harlan V. Ingman, Rte. 3, both of, Belfield, N. Dak. 58622

[21] Appl. No.: 504,085

[22] Filed: Jun. 16, 1983

Related U.S. Application Data

[63] Continuation-in-part of Ser. No. 251,097, Apr. 6, 1981, abandoned.

[51] Int. Cl.³ .................................................. A01C 1/06
[52] U.S. Cl. ...................................... 47/57.6; 106/214; 106/307; 252/29; 424/125
[58] Field of Search ................. 47/57.6, DIG. 9; 424/125; 127/32-33; 252/9, 22; 106/213-214, 307

[56] References Cited

U.S. PATENT DOCUMENTS

| | | | |
|---|---|---|---|
| 1,764,888 | 6/1930 | Raleigh | 47/57.6 |
| 2,671,985 | 3/1954 | Vogelsang | 47/57.6 |
| 2,679,460 | 5/1954 | Maneval | 106/307 X |
| 2,957,834 | 10/1960 | Moller et al. | 47/DIG. 9 |
| 3,935,099 | 1/1976 | Weaver et al. | 128/285 X |
| 4,045,387 | 8/1977 | Fanta et al. | 47/DIG. 10 |

FOREIGN PATENT DOCUMENTS

| | | | |
|---|---|---|---|
| 1027096 | 2/1978 | Canada | 47/57.6 |
| 1091056 | 12/1980 | Canada | 47/57.6 |

*Primary Examiner*—Robert E. Bagwill

[57] ABSTRACT

A product and method of making a seed coating mixture which will adhere to the seed prior to planting, which will make the seed germinate faster, and which will result in germination of a greater number of seeds.

17 Claims, No Drawings

PRODUCT AND METHOD OF MAKING A SEED COATING FOR INCREASED YIELD

This is a continuation-in-part of Ser. No. 251,097 filed 4-6-81, now abandoned.

BACKGROUND OF THE INVENTION

This invention relates to coatings for seeds to be planted which causes a higher percentage of seeds to germinate and to produce a more healthy plant which results in greater yield. More particularly, the invention is directed to a method for treating a seed coating compound such as a hygroscopic material which makes the coating compound to more readily adhere to the seeds to be planted without allowing the seeds to cake together prior to planting.

It is well known in the seed planting art that better germination, more rapid growth, and resistance to many adverse influences, after planting, have been obtained by coating the seed before or during planting with particular types of material. These types of materials include insecticides, bactericides, miticides, fungicides, and/or growth stimulating compounds. U.S. Pat. No. 2,967,376 is directed to a method for treating seeds directed to a compound which includes added stickers or adherent materials which will insure uniform retention of the material about the seed. Further, the patent is directed to the addition of a humectant or hygroscopic agent which will draw moisture to the seed after it has been planted. U.S. Pat. Nos. 3,935,099 and 4,045,387, assigned to the Department of Agriculture, are directed to compounds which are highly water absorbant and have been used as seed coating compounds to assist in attracting moisture from the earth to the seed to bring about faster germination and greater percentage of seed growth resulting in greater yield. Further, it has been determined that a greater percentage of seeds so coated and planted germinate and survive in growing to mature plants.

The greatest problems encountered with coating seeds with highly absorbent compounds, which will be referred to herein as hygroscopic materials, is its ability to adhere to the seeds and to avoid caking of the seeds once they have been coated.

SUMMARY OF THE INVENTION

This invention is directed to the addition of dry, powdered graphite to a dry weight of hygroscopic material in order to provide a mixture which will better adhere to seeds before planting.

It is, therefore, an object of the invention to provide a hygroscopic material that will better adhere to seeds to provide a complete coating on large or small seeds without the seeds caking together.

Another object is to provide a hygroscopic material that will more readily cling to seeds before and during planting to provide for better free-flowing seeds which have a higher percentage and faster germination with superior growth and yield.

DETAILED DESCRIPTION

In carrying out this invention, powdered graphite is mixed with a hygroscopic material having a high water absorbent capability. The particle-size of the graphite is not critical although particles of from about 5 to 70 microns and polymers having a mesh of 10 or smaller U.S. Standard Science are preferred.

As an example, a total mixture of hygroscopic material and powdered graphite contains from about 10% to about 25% of powdered graphite by dry weight. The powdered graphite and hygroscopic material are mixed by hand, or preferably in a mixing machine, so that there is a uniform mixture.

Graphite powders of the above mixture ratio have been mixed with super absorbent compounds such as the Super Slurpers developed by the Department of Agriculture in U.S. Pat. Nos. 3,935,099 and 4,045,387, which patents are incorporated herein by reference. A preferred superabsorbent compound is a starch-containing polymer composition such as a sponified starch-polyacrylonitrile formed by stirring a slurry consisting of from 5 to 10 percent by weight starch in water, heating for about 30 minutes at about 95 degrees C. and cooled to about 27 degrees C. under a nitrogen atmosphere. Adding 0.1 molar ceric ammonium nitrate solution in 1N nitric acid to the mixture. After about 10 minutes add acrylonitrile and stir the mixture for about 3 hours at about 35 degrees C. The starch-polyacrylonitrile graft copolymer is isolated by filtration and dried. In carrying out the method, 25.5 grams of gelatinized starch, 75.0 grams of acrylonitrile, 400 ml of water, and 1.5 m moles of $Ce^{+4}$ was used for a GS:PAN mole ratio of 1:8.6, with a yield of 97.0 grams such as set forth in U.S. Pat. No. 3,935,099. It has been determined that powdered graphite with the above ratio by weight may be added to other high absorbent polymers including those having an absorption of from 50 to 3,000 times its own weight. A greater amount of graphite may be added; however, it has been determined not to add any advantage.

The polymer-graphite mixture may be packed in waterproof bags or packages and shipped to a user. A user in this case could be a seed company who would prepare the seed by applying a fungicide and/or pesticide or any other coating. The user would then coat the prepared seed with the polymer-graphite. The seed would then be packaged in waterproof packages and shipped.

The polymer-graphite mixture may be shipped directly to a farmer who would then coat the seeds prior to transferring the seed to a seed planter, or, the coating could be applied in the seed planter.

It is not important when the polymer-graphite mixture is coated onto the seed as long as it is prior to the seed being placed in its environment to be grown.

Once the polymer-graphite mixture has been prepared as set forth above, from about 0.25% to about 5% by dry weight of the polymer-graphite is mixed with the seed which makes up the remainder of the mixture. The polymer-graphite mixture and seed are agitated in an adequate manner to distribute the polymer-graphite mixture over the entire seed. Of course, the producer of the polymer-graphite mixture could purchase the seed, coat the seed, and then ship the coated seed to the farmer.

The polymer-graphite mixture coated on the seeds provides seeds which are easily handled without caking and the mixture more readily adheres to the seed. Therefore, the seed ends up with a thicker coating of hygroscopic material so that more moisture is absorbed from the earth. Seeds coated in this manner result in a greater number of seeds germinating, require less germination time, and produce an increased yield.

With the addition of graphite to the hygroscopic material, the seeds are more uniformly coated, regardless of size, and they do not cake during coating or during storage. Since no moisture is used in the process, the polymer-graphite mixture as well as polymer-graphite mixture coated seeds have a long shelflife so long as they are contained in moisture-proof containers.

It has been proven that a greater percent of seeds with the polymer-graphite coating germinates and grows to mature plants; therefore, very little transplanting is needed after the inital planting. Since a greater percentage of the seeds planted grow into mature plants, it is obvious that a greater yield will be obtained. It is believed that seeds so coated grow into healthier plants because they get a greater start than those which are not coated.

Such absorbent polymer materials may be used for transplanting, seed coatings, pregerminated seed, hydromulching, potting soils, pretreatment of sodding, shipping bare rooted plants, soil additives, floriculture, and special purposes in laboratories. Super-absorbent polymers will absorb and release water repeatedly. It has been determined that polymer-graphite mixtures are most beneficial for aiding in coating seeds to make the hygroscopic material adhere to the seed and to avoid caking. For other uses, set forth above, graphite is not necessary in the absorbent material. The polymer-graphite forms a moisture capsule around the seed which aids in germination.

As an example, soybeans had a greater germination of from 7% to 28% with an increase in yield of about 18 bushels per acre.

Cotton had a yield of about $50 per acre. The percent of seed germination was not determined.

Corn had an improved germination of from 5% to 18% with an increase in yield of about 13 bushels per acre.

Any seed (garden and farm crop variety) can be coated regardless of their fragility at a cost of from about $1.50 to about $4.00 per acre.

It is to be understood that the foregoing detailed description is given by way of illustration, and that modifications and variations may be made without departing from the spirit and scope of the invention.

What is claimed and desired to be secured by Letters Patent of the United States is:

1. A method of making a seed coating which will increase the percentage of seeds germinated and decrease germinating time comprising:
   mixing dry powdered graphite with a dry hygroscopic material to form a uniform mixture in which said dry powder graphite is from about 10% to about 25% by weight of the mixture.
2. A method as claimed in claim 1, wherein:
   said graphite powder has a mesh of from about 5 to about 70 microns.
3. A method as claimed in claim 2, wherein:
   said hygroscopic material has a mesh of 10 or less.
4. A method as claimed in claim 3, wherein:
   said hygroscopic material is a copolymer of starch and polyacrylonitrile.
5. A method as claimed in claim 2 wherein:
   said hygroscopic material is a copolymer of starch and polyacrylonitrile.
6. A method as claimed in claim 1, wherein:
   said hygroscopic material is a copolymer of starch and polyacrylonitrile.
7. A method as claimed in claim 1, wherein: said hygroscopic material is a copolymer of starch and polyacrylonitrile.
8. A method of preparing seed to be planted so that an increased percentage of seeds will germinate and the germinating period will be less, which comprises:
   mixing a dry powdered graphite with a dry hygroscopic material to form a uniform dry graphite-hygroscopic material mixture wherein said dry graphite is from about 10% to about 25% by weight of the total weight of said dry graphite-hygroscopic material mixture;
   adding the seed to be planted to said uniform mixture;
   agitating said seed to be planted with said uniform dry graphite-hygroscopic material mixture until said seed to be planted is uniformly coated with said mixture.
9. A method as claimed in claim 8, wherein:
   said dry graphite powder has a mesh of from about 5 to about 70 microns.
10. A method as claimed in claim 9, wherein:
    said dry hygroscopic material has a mesh of from 10 or less.
11. A method as claimed in claim 10, wherein:
    said dry hygroscopic material is a copolymer of starch and polyacrylonitrile.
12. A method as claimed in claim 8, wherein: said hygroscopic material is a copolymer of starch and polyacrylonitrile.
13. A product which is used to coat seed to be planted so that a larger percentage of the seed will germinate and the germination period will be less comprising:
    a dry powder graphite and a dry hygroscopic material uniformly mixed together in which said dry powder graphite comprises from about 10% to about 25% of the mixture.
14. A product as claimed in claim 13, in which:
    said dry powdered graphite has a mesh of from about 5 to about 70 microns.
15. A product as claimed in claim 13, in which:
    said dry hygroscopic material has a mesh of from 10 or less.
16. A product as claimed in claim 15, in which:
    said dry powdered graphite has a mesh of from about 5 to about 70 microns.
17. A product as claimed in claim 13, wherein: said hygroscopic material is a copolymer of starch and polyacrylonitrile.

* * * * *